United States Patent [19]

Bugga et al.

[11] Patent Number: 5,019,470
[45] Date of Patent: May 28, 1991

[54] METAL CHLORIDE CATHODE FOR A BATTERY

[75] Inventors: Ratnakumar V. Bugga, Arcadia; Salvador DiStefano, Alhambre; C. Perry Bankston, Studio City, all of Calif.

[73] Assignee: The United States of America as represented by the Administrator of the National Aeronautics and Space Administration, Washington, D.C.

[21] Appl. No.: 503,409

[22] Filed: Mar. 30, 1990

[51] Int. Cl.$^5$ .................... H01M 4/58; H01M 4/04
[52] U.S. Cl. .................................. 429/223; 29/623.5
[58] Field of Search .................... 429/223; 29/623.5

[56] References Cited

U.S. PATENT DOCUMENTS

| 3,959,012 | 5/1976 | Liang et al. | 429/223 X |
| 4,508,799 | 4/1985 | Gopikanth et al. | 429/223 X |
| 4,529,676 | 7/1985 | Galloway et al. | 429/223 X |
| 4,626,483 | 12/1986 | Bones et al. | 429/103 X |

Primary Examiner—Stephen J. Kalafut
Attorney, Agent, or Firm—Thomas H. Jones; Harold W. Adams; John R. Manning

[57] ABSTRACT

In a method of fabricating a rechargeable battery which includes a positive electrode which contains a chloride of a selected metal when the electrode is in its active state, the improvement comprising fabricating the positive electrode by: providing a porous matrix composed of a metal; providing a solution of the chloride of the selected metal; and impregnating the matrix with the chloride from the solution.

14 Claims, 1 Drawing Sheet

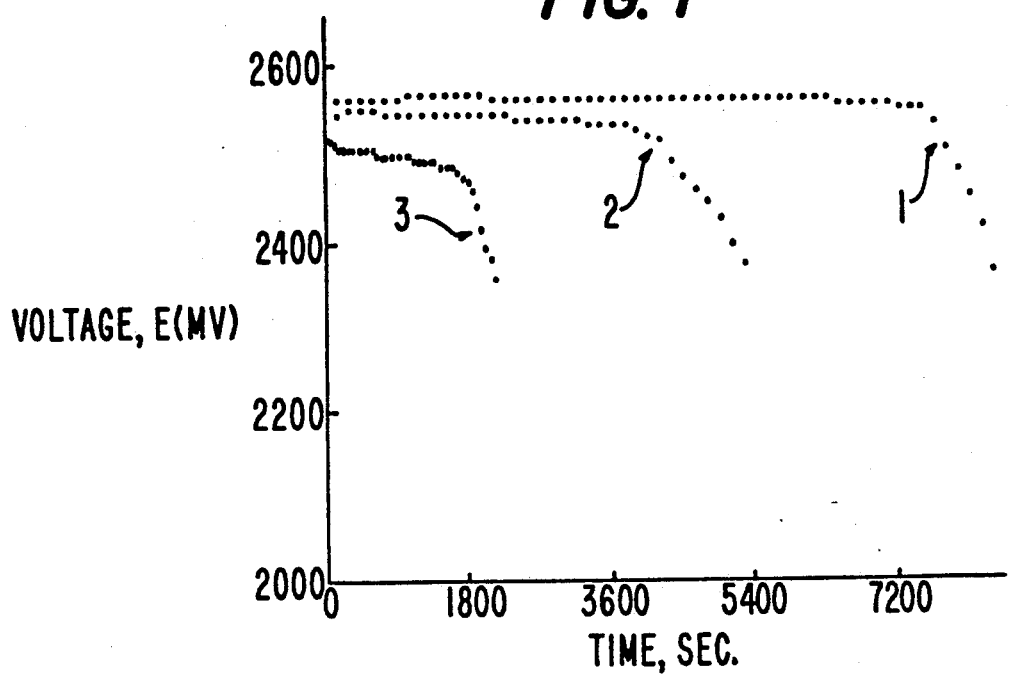
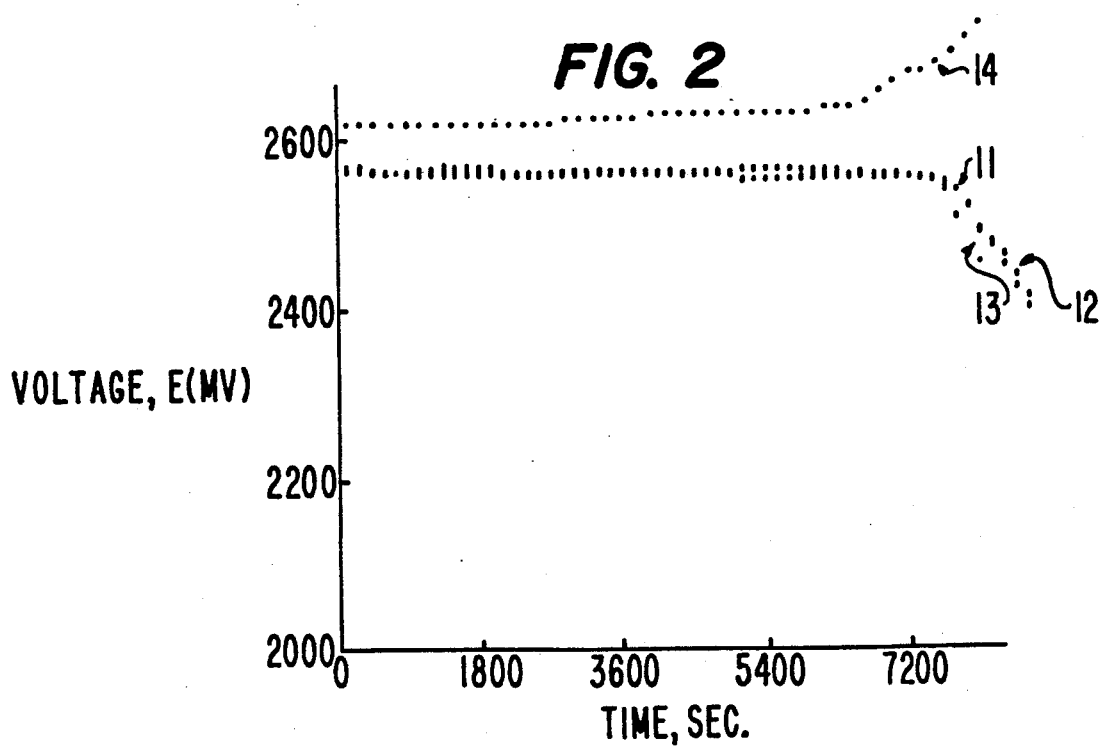

METAL CHLORIDE CATHODE FOR A BATTERY

ORIGIN OF THE INVENTION

The invention described herein was made in the performance of work under a NASA contract, and is subject to the provisions of Public Law 96-517 (35 U.S.C. 202) in which the Contractor has elected not to retain title.

TECHNICAL FIELD

The present invention relates to rechargeable batteries, and particularly batteries having a metal chloride cathode.

BACKGROUND OF THE INVENTION

Batteries, such as sodium batteries, having a metal chloride cathode are known to constitute useful rechargeable energy sources having high energy and power density properties. While sodium-sulfur batteries have proven useful, they have been found to have certain shortcomings.

In particular, known sodium-sulfur batteries experience significant corrosion problems, due to higher operating temperatures, and present safety hazards Sodium-sulfur batteries also suffer from degradation of solid electrolytes in polysulfide melts.

Recently, sodium batteries with metal chloride cathodes have attracted interest because they appear to offer energy densities comparable to those of sodium-sulfur batteries, but are less subject to the above-described drawbacks. Energy density is here defined as the open-circuit voltage of the battery multiplied by its coulombic capacity in ampere-hours, divided by the weight of the electrodes.

Among the various metal chlorides which have been investigated for use as cathodes, nickel chloride has been found to be worth considering because it provides an energy density higher than that of ferrous chloride and presents a good resistance to overcharge.

Various approaches to the fabrication of the positive electrode, or cathode, of such a battery have included: producing a porous metal body by sintering a metal powder in a reduced atmosphere and then chlorinating the metal body; impregnating a metal matrix with a brine solution of sodium chloride and assembling the battery in the discharged state; sintering a mixture of metal powders and a slurry of sodium chloride in brine; and sintering dry powders of metal and sodium chloride. Subsequent to fabrication, the electrode must be converted to active form electrochemically to form $NiCl_2$.

Thus, formation of such an electrode entails a number of steps. Moreover, particularly if the electrode is formed by sintering metal powder and sodium chloride together, the resulting electrode may not exhibit great mechanical strength. Therefore, the electrode is subject to failure due to mechanical stresses induced therein during successive charging and discharging cycles.

STATEMENT OF THE INVENTION

It is an object of the invention to provide an improved positive electrode for such rechargeable batteries.

Another object of the invention is to provide an improved method for fabricating such positive electrode.

A more specific object of the invention is to simplify the fabrication of a metal chloride cathode electrode for a rechargeable battery.

A further specific object of the invention is to increase the mechanical strength, and particularly the stress resistance of such positive electrodes to improve cyclability as demonstrated by the adoption of similar technique for the fabrication of electrodes in other aerospace batteries.

The above and other objects are achieved, according to the invention in a method of fabricating a rechargeable battery which includes a positive electrode which contains a chloride of a selected metal when the electrode is in its active state, by fabricating the positive electrode by: providing a porous matrix composed of a metal which is at least as noble as the selected metal; providing a solution of the chloride of the selected metal; and impregnating the matrix with the chloride of the selected metal from the solution.

The objects according to the invention are further achieved by the provision of a rechargeable battery having a positive electrode fabricated in the manner described above.

Batteries constructed with a positive electrode according to the invention can be used to advantage in spacecraft, electric vehicles, military vehicles and other applications where a high energy density power source is desired.

The metal of the matrix may be the selected metal. However, improved results will be achieved if the metal of the matrix is nobler than the selected metal.

BRIEF DESCRIPTION OF THE DRAWINGS

FIG. 1 is a diagram illustrating the discharge behavior at different rates of an $NiCl_2$-Na battery having a positive electrode according to the invention.

FIG. 2 is a diagram illustrating the performance of the same battery during selected charge and discharge periods.

DETAILED DESCRIPTION OF THE INVENTION

The invention is applicable to any battery having a cathode, in batteries the cathode being the positive electrode, made of $NiCl_2$ or a chloride of any suitable metal, such as Fe, Cu, etc., and an anode, or negative electrode, of sodium, lithium, or other alkali or alkaline earth metals. There presently appears to be a preference in the art for $NiCl_2$ cathodes, for reasons mentioned earlier herein, and sodium or lithium anodes.

The electrolyte of such a battery is selected, on the basis of known principles, to have a composition compatible with the electrodes. One electrolyte system to which the invention may be advantageously applied is composed of beta alumina solid electrolyte and $NaAlCl_4$, preferably in conjunction with sodium and $NiCl_2$ electrodes.

According to a preferred embodiment of the invention, the electrode is constituted essentially by a nickel matrix impregnated with nickel chloride. The nickel matrix may be a sintered nickel plaque of a type which is commercially available and is used in Ni-Cd batteries. Chloride is introduced into the matrix from a saturated nickel chloride solution.

The nickel chloride constitutes the active material of the cathode and higher loadings in the matrix can be achieved by using techniques such as vacuum impregnation, etc.

It may additionally be beneficial to subject the nickel matrix to pretreatments of the type performed on NiCd batteries, such as preoxidation.

Because the impregnated material is already in the form of metal chloride, subsequent steps to activate the electrode are not required.

The materials constituting the matrix and the impregnating solution need not be specially purified and battery grade nickel and nickel chloride have been found to produce good results. In more general terms, any metals known to be suitable for a battery cathode can be used for the matrix and the chloride.

A positive electrode according to the invention was fabricated by chemically impregnating a nickel plaque body with nickel chloride from its saturated solution to a loading of 4 mAh/cm$^2$. Higher loadings should be possible if optimum conditions and improved impregnation methods are employed. The electrode was then dried overnight at 150° C. The electrode had an area of 4 cm$^2$, and thus a total loading of 16 mAh. The electrode was part of a Na/beta battery, the electrode was found to have high columbic yields of above 95%, based on the amount of NiCl$_2$ impregnated, at high current densities greater than 8 mA/cm$^2$. The discharge of a battery equipped with this electrode is depicted in FIG. 1 in terms of the variation in battery voltage with time for three discharge current levels.

Curve 1 of FIG. 1 corresponds to a discharge current of 8 mA, curve 2 a discharge current of 16 mA and curve 3 a discharge current of 32 mA.

Moreover, the battery experienced no detectable loss in capacity as a result of charge/discharge cycling, implying a high degree of integrity of the positive electrode This is illustrated in FIG. 2, which shows the variation of the battery voltage with time during successive discharges and during one charge, at a temperature of 200° C., and with a current in each case of 8 mA.

Curves 11, 12 and 13 represent the battery voltage variation during the second, third and fourth discharges, respectively, while curve 14 represents the battery voltage variation during the second charge. The voltage variation during the first discharge is shown by curve 1 of FIG. 1.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

We claim:

1. In a method of fabricating a rechargeable battery which includes a positive electrode which contains a chloride of a selected metal when the electrode is in its active state, the improvement comprising fabricating the positive electrode by: providing a porous matrix composed of a metal which is at least as noble as the selected metal; providing a solution of the chloride of the selected metal; and impregnating the matrix with the chloride from the solution.

2. A method as defined in claim 1 wherein the solution provided is a saturated solution of the metal chloride.

3. A method as defined in claim 2 wherein said step of impregnating is performed under a vacuum.

4. A method as defined in claim 3 wherein the porous matrix consists essentially of nickel.

5. A method as defined in claim 4 wherein the porous matrix consists essentially of a sintered nickel plaque.

6. A method as defined in claim 3 wherein the porous matrix consists essentially of a metal which is nobler than the selected metal.

7. A method as defined in claim 3 wherein the selected metal of the chloride is nickel.

8. A method as defined in claim 3 wherein the metal of the porous matrix is the same as the selected metal of the chloride.

9. A method as defined in claim 1 wherein the porous matrix consists essentially of nickel.

10. A method as defined in claim 10 wherein the porous matrix consists essentially of a sintered nickel plaque.

11. A method as defined in claim 1 wherein the porous matrix consists essentially of a metal which is nobler than the selected metal.

12. A method as defined in claim 1 wherein the selected metal of the chloride is nickel.

13. A method as defined in claim 1 wherein the metal of the porous matrix is the same as the selected metal of the chloride solution.

14. A rechargeable battery comprising a positive electrode fabricated by the method defined in claim 1, said electrode including: the porous matrix of the metal which is at least as noble as the selected metal; and the chloride of the selected metal present only in the pores of the matrix.

* * * * *